US007725926B1

(12) United States Patent
Karp et al.

(10) Patent No.: US 7,725,926 B1
(45) Date of Patent: May 25, 2010

(54) AUTHENTICATION

(75) Inventors: Alan H. Karp, Palo Alto, CA (US);
Patrick C. McGeer, Orinda, CA (US);
Mark S. Miller, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1254 days.

(21) Appl. No.: 10/924,295

(22) Filed: Aug. 23, 2004

(51) Int. Cl.
G06F 7/04 (2006.01)
G06F 15/16 (2006.01)
G06F 17/30 (2006.01)
H04L 29/06 (2006.01)

(52) U.S. Cl. .................... 726/5; 726/2; 726/4; 726/27; 713/182

(58) Field of Classification Search ................ 726/5
See application file for complete search history.

(56) References Cited

U.S. PATENT DOCUMENTS

| | | | | |
|---|---|---|---|---|
| 5,719,941 | A * | 2/1998 | Swift et al. | 713/155 |
| 5,841,871 | A | 11/1998 | Pinkas | |
| 5,961,593 | A * | 10/1999 | Gabber et al. | 709/219 |
| 6,067,621 | A * | 5/2000 | Yu et al. | 713/172 |
| 6,148,404 | A * | 11/2000 | Yatsukawa | 726/2 |
| 6,539,479 | B1 * | 3/2003 | Wu | 713/151 |
| 6,662,300 | B1 * | 12/2003 | Peters | 713/182 |
| 6,834,112 | B1 * | 12/2004 | Brickell | 380/279 |
| 6,996,718 | B1 * | 2/2006 | Henry et al. | 713/182 |
| 7,231,518 | B1 * | 6/2007 | Bakke | 713/168 |
| 2002/0046189 | A1 * | 4/2002 | Morita et al. | 705/67 |
| 2002/0073322 | A1 * | 6/2002 | Park et al. | 713/188 |
| 2003/0163737 | A1 * | 8/2003 | Roskind | 713/201 |
| 2004/0003241 | A1 * | 1/2004 | Sengodan et al. | 713/168 |
| 2004/0025026 | A1 | 2/2004 | Karp | |
| 2004/0030660 | A1 | 2/2004 | Shatford | 705/67 |
| 2004/0078447 | A1 * | 4/2004 | Malik et al. | 709/206 |
| 2004/0103303 | A1 * | 5/2004 | Yamauchi et al. | 713/200 |
| 2004/0158714 | A1 * | 8/2004 | Peyravian et al. | 713/171 |
| 2006/0168253 | A1 * | 7/2006 | Baba et al. | 709/229 |

FOREIGN PATENT DOCUMENTS

WO 01/75826 A1 10/2001

OTHER PUBLICATIONS

N. Haller, "The S/Key One-Time Password System", RFC 1760, Feb. 1995. N. Haller et al., "A One-Time Password System", RFC 2289, Feb. 1998.

* cited by examiner

*Primary Examiner*—Emmanuel L Moise
*Assistant Examiner*—Luu Pham

(57) ABSTRACT

A method for authentication in a client computer and a remote computer is disclosed. A client base value is obtained, selected by a user of the client computer for at least a first usage purpose. A client integer is obtained, selected by the user for at least a second usage purpose. The client base value is combined with the client integer to obtain a client combination. The client combination is hashed to obtain a client password.

6 Claims, 5 Drawing Sheets

AUTHENTICATION

BACKGROUND

Many computer systems and web sites require their users to be authenticated. Passwords provide the simplest and most widely used form of user authentication. However, the use of conventional passwords raises numerous widely recognized issues. Passwords that are easy to remember are also easy for others to guess, and may be vulnerable to automated attacks, such as dictionary attacks. Passwords that are difficult to remember are often forgotten, particularly if a user has many of them. Where a user chooses identical passwords for multiple systems, a malefactor who obtains the password may be able to compromise the security of multiple systems. In an illustrative example, this drawback may have unfortunate repercussions for a user who chooses to use the same password on a plurality of e-commerce web sites, each of which may store the user's credit card information.

Ordinary passwords are vulnerable to replay attacks; that is, once the password is captured by an attacker, there is no way for a server to tell the difference between the attacker and the legitimate user. One conventional method for enhancing security is to enforce a policy of using a password only once, then discarding it in favor of a new password. In this way, even if the one-time password is intercepted by a third party (for instance, by recording keystrokes or eavesdropping on network connections), it is no longer useful.

Since the early developmental stages of the Internet, a community of computer networking academics and professionals has promulgated proposed standards in numbered Requests for Comments (RFC), These proposed standards include systems for generating one-time passwords, such as OTP (described by Neil Haller et al. in RFC 2289, entitled "A One-Time Password System," dated February 1998) and its predecessor S/KEY (described by Neil Haller in RFC 1760, entitled "The S/KEY One-Time Password System," dated February 1995). In both systems, a user creates a password and hashes it a large number of times; for example, 100 times. The result is sent to a server and stored in a table entry for the user. The user then logs on the first time, using the password hashed 99 times. The server can hash it one more time and compare it with the stored result. If it matches, the logon is permitted, and the new value is stored in the table. The next time the user logs in, the user will submit the password hashed 98 times, and so on. While OTP and S/KEY are widely available, they share the disadvantage that a given password can only be used a predetermined number of times. If this count is exceeded, the user cannot log on. Also, the user must remember a separate count for each computer system, or be prepared to have passwords expire for all systems that share the same count, when a shared count exceeds the predetermined limit.

An additional use for authentication is the control of unwanted email, such as unsolicited bulk or commercial email, also known as spam. Spammers may collect email addresses and resell them. They also may track responses from specific email addresses, often using web bugs, to determine which addresses are monitored. They also may perform correlations across mailing lists to identify communities where a given email address may be used. Conventional spam filtering systems may include blacklists for identifying senders known or believed to be spammers, and whitelists for identifying senders known to be desirable sources of email. However, such systems may not be able to authenticate the identity of a sender with sufficient reliability, leading to false positives and false negatives in conventional spam filters.

SUMMARY

In one embodiment, the invention comprises a method for authentication in a client computer and a remote computer. A client base value is obtained, selected by a user of the client computer for at least a first usage purpose. A client integer is obtained, selected by the user for at least a second usage purpose. The client base value is combined with the client integer to obtain a client combination. The client combination is hashed to obtain a client password.

The foregoing presents a simplified summary of the invention in order to provide a basic understanding of some aspects of the invention. This summary is not an extensive overview of the invention, and is intended to neither identify key or critical elements of the invention nor delineate the scope of the invention. Other features of the invention are further described below.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Figure 1:
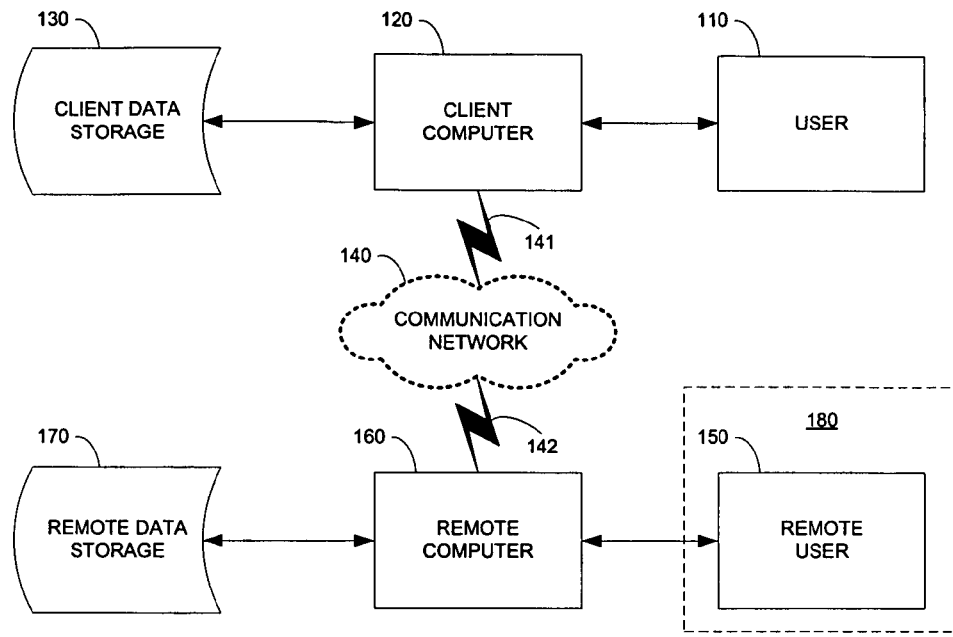
FIG. 1 is a flow chart illustrating components of an embodiment of the invention.

Referring to the drawings, in which like reference numerals indicate like elements, FIG. 1 illustrates components of an embodiment of the invention. A user 110 of a client computer 120 may be a person, or may comprise any actor able to interact with the client computer 120, such as an automated system, software application, process, daemon, or device. The client computer 120 is communicatively coupled by a first communication link 141 to a communication network 140, such as the Internet, a local or wide-area network, or the like. The client computer 120 is also communicatively coupled to client data storage 130. Client data storage 130 may, for example, comprise local or remote disk drives or other mass storage devices, networked data storage devices, random access memory, and the like. Client data storage 130 may in some embodiments be accessed through communication network 140.

A remote computer 160 is communicatively coupled to the communication network 140 by a second communication link 142, and is also communicatively coupled to remote data storage 170. Remote data storage 170 may, for example, comprise local or remote disk drives or other mass storage devices, networked data storage devices, random access memory, and the like. Remote data storage 170 may in some embodiments be accessed through communication network 140.

In some embodiments, a remote user 150 of the remote computer 160 may be a person, or may comprise any actor able to interact with the remote computer 160, such as an automated system, software application, process, daemon, or device. The remote user 150 may, in an illustrative example, comprise an automated mailing list software application; for example, a list manager that periodically sends or forwards email (or collections such as daily digests of email) to members of a distribution list.

A community 180 includes members such as Internet users; for example, participants in an Internet newsgroup or other discussion group. As shown in the drawing, the community 180 may include the remote user 150 as a member of the community 180. However, the community 180 does not necessarily include the remote user 150. Members may have the ability to join or to be removed from the community 180, and the community 180 may have any number of members, including zero members. Additional illustrative examples of communities 180 include business entities, Web site operators, professional organizations, social organizations, email distribution lists, and the like. In some embodiments, the user 110 may desire to designate, create, or select a community 180 for purposes which may include granting members of the community 180 access to an electronic mail inbox associated with the user 110. The user 110 may, if desired, grant access to a community 180 comprising all Internet users.

Figure 2:
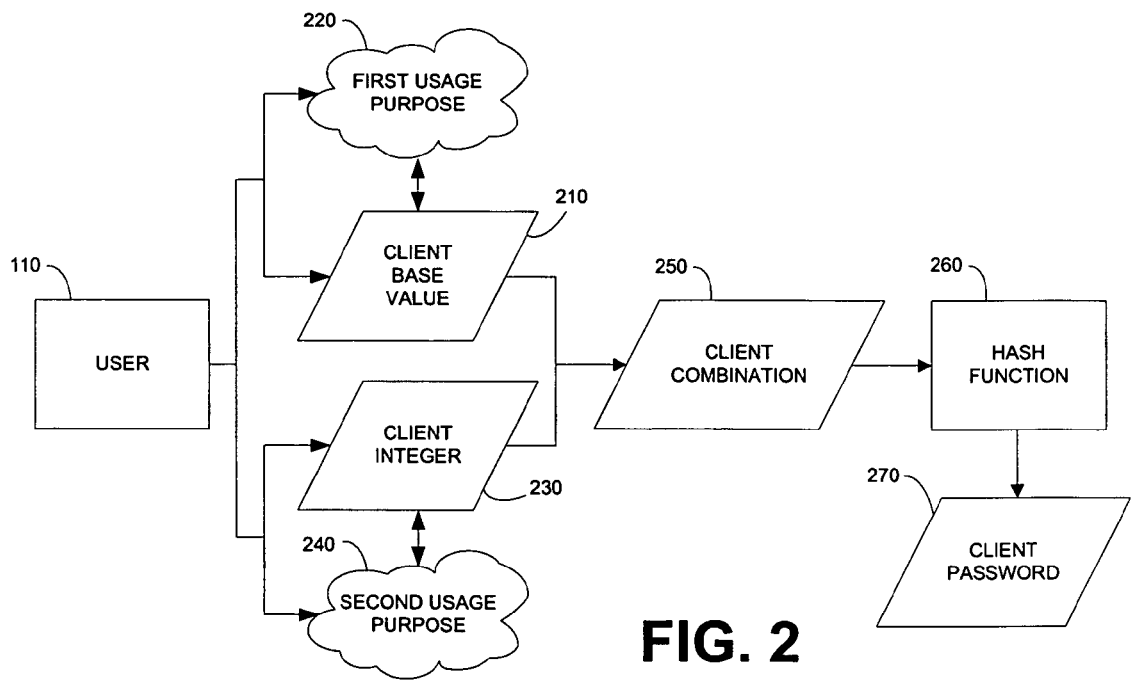
FIG. 2 is a data flow chart illustrating formation of a client password according to an embodiment of the invention.

FIG. 2 is a data flow chart illustrating formation of a client password 270 according to an embodiment of the invention. The user 110 selects a client base value 210 for at least a first usage purpose 220, and a client integer 230 for at least a second usage purpose 240.

The first usage purpose 220 is associated with the client base value 210. For example, the user 110 may initially select or formulate the first usage purpose 220, and subsequently select or formulate a client base value 210 suitable for the first usage purpose 220. Similarly, the second usage purpose 240 is associated with the client integer 230. For example, the user 110 may initially select or formulate the second usage purpose 240, and subsequently select or formulate a client integer 230 suitable for the second usage purpose 240.

The client base value 210 is combined with the client integer 230 to obtain a client combination 250. The client base value 210 and client integer 230 may be combined in any of numerous ways, including string concatenation, and may be combined in any order. In some embodiments, the selected way of combining the client base value 210 and client integer 230 is consistently applied each time a client combination 250 is created, and is known to the remote computer 160.

The client combination 250 is then hashed, such as by passing the client combination 250 through a hash function 260. The resulting hash value is the client password 270. The hash function 260 is a transformation that takes a variable-size input and returns an output, which is called a hash value. The hash value is also sometimes known as a message digest. Well-known examples of the hash function 260 include MD4, MD5, and SHA-1. MD4 and MD5, which are message digest algorithms described by Ronald L. Rivest in RFC 1320 and RFC 1321, respectively, each produce a fixed-size 128-bit hash value. SHA-1, an algorithm developed by the National Institute of Standards and Technology, produces a fixed-size 160-bit hash value. In some embodiments, the client password 270 may be formed by converting the hash value from hexadecimal or other numeric form to an alphanumeric ASCII string, such as by applying BASE64 encoding (as particularly described in RFC 1341) to the hash value, or to a string representation of the hash value.

The client password 270 may in some embodiments be truncated, for reasons which may include ease of use and enhanced security. For example, truncation enhances security in that a malefactor attempting a dictionary attack to discover the base value will find many collisions with a truncated client password 270. Each one will have to be tested on-line to see if it is the right client password 270. Such on-line attacks are slow, and numerous failures may be logged or otherwise noticed, so as to provide a warning to the user 110 or to a system administrator that the client password 270 may be compromised or under attack.

Preferably, the selected hash function 260 should be one-way, such that given a known hash value, it is computationally infeasible to find an input for the hash function 260 that will yield the known hash value. The hash function 260 preferably should also be collision-free, such that given a known input, it is computationally difficult or infeasible to find a second input, not equal to the first input, that produces the same hash value. MD5 and SHA-1 are exemplary hash functions 260 which have these desirable features. A well-chosen hash function 260, such as MD5 or SHA-1, makes accidental collisions unlikely and protects the client base value 210 from being revealed to those who may observe the client password 270.

The following table shows four simple examples of the formation of a client password 270. The first column shows an exemplary client combination 250, to be used as a string input for the hash function 260. The second column shows an exemplary hash value, resulting from hashing the client combination 250 using MD5 as the hash function 260. Note that regardless of the length of the client combination 250, the use of the MD5 hash function 260 yields a hash value that is thirty-two hexadecimal digits in length, representing a 128-bit value. The hexadecimal representation of the hash value may in some embodiments be used as the client password 270. For an alternative embodiment, the third column shows an exemplary client password 270 after applying BASE64 encoding to the hash value, and truncating at twelve characters.

TABLE 1

| Client combination | Hash value (hexadecimal) | Client password |
|---|---|---|
| abc101 | 4B91D02D7850C5B775C12873BD863913 | S5HQLXhQxbd1 |
| base1 | 3CE9B3A20D290FBC8645F8BFDA59B159 | POmzog0pD7yG |
| base2 | CA59817B3061870C06B8C688A6785603 | ylmBezBhhwwG |
| base100 | 326C78E40C3C3CF8EAACE48D0FD5A8BC | Mmx45Aw8PPjq |

Example 1

One-Time Password

In one embodiment, the first usage purpose 220 comprises generating a one-time password; for example, a one-time password for use in authenticating the user 110, such that the user 110 is able to access remote computer 160, or a Web site at remote computer 160. An illustrative example of a suitable client base value 210 is a system-specific password. The system-specific password may, for instance, comprise a string value associated with the remote computer 160, such as a domain name or URL. Such a string value may, in another embodiment, be combined with a password selected by the user 110, and the resulting combination may be hashed using the hash function 260 to obtain the client base value 210. An example of a system-specific password is particularly described in the patent application of Karp et al. entitled "System-Specific Passwords," filed Aug. 2, 2002, and published on Feb. 5, 2004 as U.S. Pub. No. 2004/0025026 A1.

The second usage purpose 240, in some embodiments, comprises obtaining access to a resource; for example, to a computer system such as remote computer 160, to a password-protected Web site on a remote computer 160, or to a networked device. The resource may be protected such that the user 110 may obtain the desired access with a one-time password for use in authenticating the user 110. The client integer 230 is associated with the exemplary second usage purpose 240 as follows: the client integer 230 is selected at or before the time of each use such that the client integer 230 increases each time that it is used. The value of the client integer 230 may be maintained and incremented manually or automatically; for example, by the user 110, by the client computer 120, or by a software application. The client integer 230 may be incremented by 1 with each use, or may be incremented by a larger number. Because the client integer 230 is incremented, rather than decremented, it may be used an arbitrarily large number of times.

Figure 3:
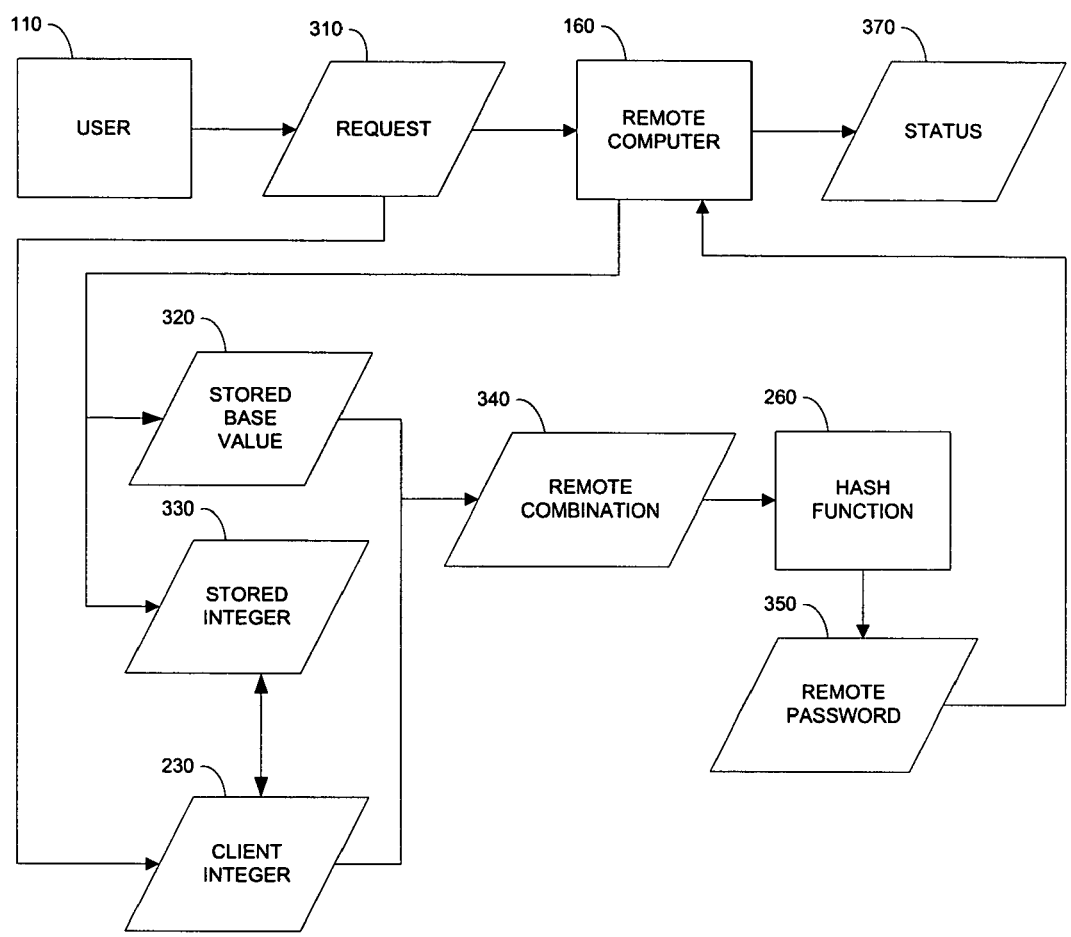
FIG. 3 is a data flow chart illustrating disposition of a request according to an embodiment of the invention.

In FIG. 3, the disposition of a request 310 by the user 110 for the desired access to a resource is illustrated according to an embodiment of the invention. An exemplary resource is the remote computer 160. The request 310 includes the client password 270 and the client integer 230. The request 310 is submitted by the user 110 to the remote computer 160.

Prior to the submission of the request 310, the remote computer 160 has obtained and stored a stored base value 320 and a stored integer 330 associated with the user 110. The stored base value 320 and the stored integer 330 may be stored in remote data storage 170, such as in a database, table, password file, or other type of data file securely accessible to the remote computer 160. In an illustrative example, a remote computer 160 functioning as a web site server may establish a requirement for the user 110 to go through a registration procedure, in order to obtain access to password-protected areas of the web site.

In addition to the stored base value 320 and stored integer 330, the registration procedure may provide the remote computer 160 with indicia of the identity of the user 110, allowing the user 110 to be matched to a stored record in remote data storage 170. Such a record may or may not include personally identifiable information such as a full name, but generally at least allows a repeat visitor to be identified as such, and linked to data that persists across multiple visits. On an exemplary remote computer 160, registration may be primarily implemented for purposes of security and access control, but registration may also be used by a web site server, for example, to collect information on a per-user basis for purposes such as marketing and statistical tracking.

As part of the registration procedure, the remote computer 160 may prompt the user 110 to enter a base value. In some embodiments, the user 110 may also be prompted to enter an integer. In response, the user 110 may send an initial request 310 comprising the client base value 210 and in some embodiments the client integer 230, for a first usage purpose 220 that may include initializing the stored base value 320 and the stored integer 330. If the client integer 230 is not included in the initial request 310, the stored integer 330 may be initialized to zero. The initial value of the stored base value 320 is set to the client base value 210. The initial value of the stored integer 330 is set to the client integer 230. The stored base value 320 and the stored integer 330 may thereafter be stored and/or maintained by the remote computer 160 for use with a subsequent request 310.

Establishing or initializing access for the user 110, which involves the transmission of the client base value 210, may in some embodiments be done over a secure channel, such as a wired communication link 141. Subsequent requests 310 may, in some embodiments, use a less secure channel, such as a wireless communication link 141, because the user 110 may then use a client password 270 without fear of being compromised by replay attacks. A replay attack occurs when a password is observed and recorded by an attacker who then attempts to use the recorded password.

For a subsequent request 310, the remote computer 160 compares the client integer 230 to the stored integer 330. If the client integer 230 is smaller than or equal to the stored integer 330, the request 310 is rejected, and a status 370 is set to indicate that authorization has been denied. However, if the client integer 230 is larger than the stored integer 330, the remote computer 160 combines the stored base value 320 with the client integer 230 to obtain a remote combination 340. The stored base value 320 and client integer 230 may be combined by the remote computer 160 in the same way that the client computer 120 combines the client base value 210 with the client integer 230 to obtain the client combination 250. The remote computer 160 then hashes the remote combination 340, such as by passing the remote combination 340 through the hash function 260. The resulting hash value is the remote password 350.

If the remote password 350 does not match the client password 270 that was received as part of request 310, the request 310 is rejected, and a status 370 is set to indicate that authorization has been denied. If the remote password 350 matches the client password 270 that was received as part of request 310, the request 310 is accepted, and a status 370 is set to indicate that authorization has been granted. For example, the status 370 may be a boolean value returned by an authorization-checking function. The status 370 may in some embodiments include additional information, but includes at least an authorization or an absence of authorization. In response to the status 370, the remote computer 160 may, as appropriate, grant or deny access to the resource desired by the user 110.

Example 2

Spam Control

Figure 4:
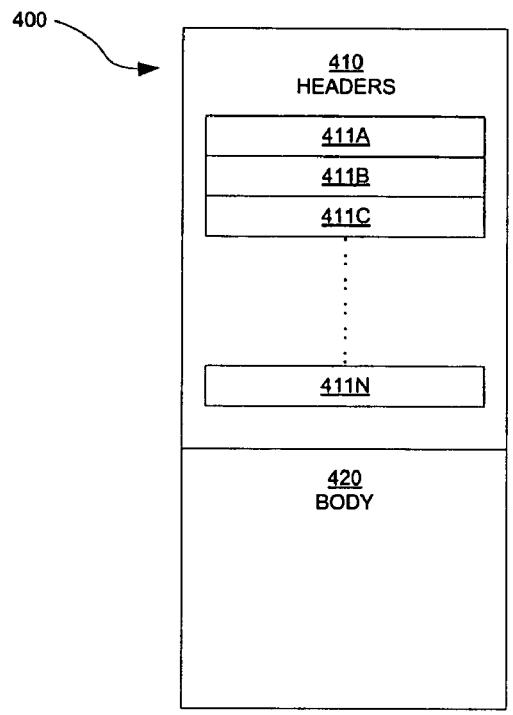
FIG. 4 is a diagram illustrating an exemplary email for use in an embodiment of the invention.

In FIG. 4, an exemplary email 400 for use in an embodiment of the invention is illustrated. In some embodiments of the invention, the user 110 may desire to limit access to the client computer 120, such as to filter unwanted emails 400, which may be perceived or designated by the user 110 as spam.

The email 400 includes a header section 410 and a message body section 420. The message body section 420 may have various formats. The header section 410 includes a plurality of header fields as illustrated by exemplary header fields 411A, 411B, 411C, . . . , 411N, collectively referred to as the header fields 411. An example of an email 400 suitable for use in an embodiment of the invention is particularly described by David H. Crocker in RFC 822, entitled "Standard for the Format of ARPA Internet Text Messages," dated Aug. 13, 1982. The email 400 may also include attachments.

In some embodiments, the header fields 411 include destination fields, which may comprise a string identifying the header field 411 (such as "To," "CC," or "BCC"), followed by a colon, followed by a destination address value. In further embodiments, the header fields 411 also include optional fields, which may comprise a string identifying the header field 411 (such as "Subject" and "Comments" fields), followed by a colon, followed by a string value.

In still further embodiments, the header fields 411 include user-defined fields, which may comprise a string beginning with the letter X and a hyphen ("X-"), followed by a string identifying the user-defined header field 411, followed by a colon, followed by a string value. User-defined header fields 411, such as the foregoing exemplary headers sometimes known as X-headers, are a feature commonly used by software applications for transmitting and receiving email 400 over the Internet.

Figure 5:
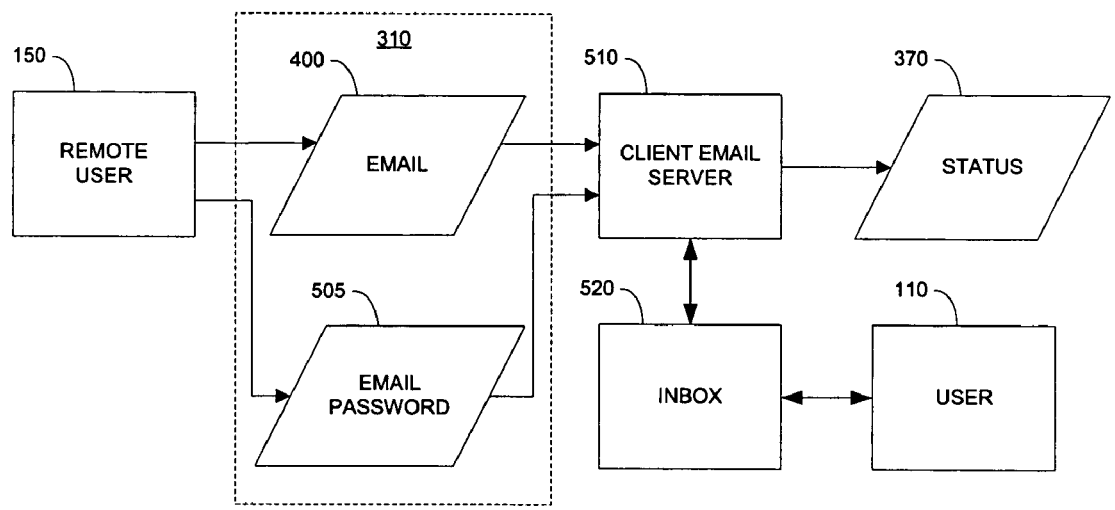
FIG. 5 is a data flow chart illustrating disposition of a request according to an alternative embodiment of the invention.

FIG. 5 is a data flow chart illustrating the disposition of a request 310 for delivery of an email 400, according to an alternative embodiment of the invention. The request 310 may comprise the email 400 and an email password 505. In some embodiments, the request 310 may, instead of or in addition to the email 400 and email password 505, comprise a link, pointer, or other information which the client email server 510 can use to obtain the email 400 or portions thereof. The email password 505 may in some embodiments be included in the email 400, as discussed in detail below.

The request 310 is submitted by a remote user 150. As illustrated, the remote user 150 requests delivery of the email 400 to an email inbox 520 associated with the user 110. The request 310 is transmitted to a client email server 510. The client email server 510 may be the client computer 160, or may be communicatively linked to the client computer 160, for example, by communications link 141. The client email server 510 is able to deliver email 400 to the inbox 520. The client email server 510 is also able to reject email 400, and may in some embodiments return or bounce a rejected email 400 back to the remote user 150. The client email server 510 may set a status 370 to indicate whether delivery authorization has been granted or denied.

In some embodiments of the invention, the user 110 may desire to limit access to the email inbox 520 associated with the user 110 or associated with another user of the client computer 120. It may be desirable, for instance, to grant access to a selected email sender or a selected community 180, while restricting the ability of others to send spam or other unwanted email to the email inbox. The first usage purpose 220 may comprise granting access to the selected email sender, such as remote user 150. In yet another embodiment, the first usage purpose 220 may comprise granting access to a member of the selected community 180.

An illustrative example of a suitable client base value 210 is a string value associated with the selected sender or selected community 180, such as a name. Such a string value may in some embodiments be combined with a password selected by the user 110, and the resulting combination may be hashed using a hash function 260, as described in detail above, to obtain the client base value 210. For example, a user 110 may concatenate a name for a community 180, such as "ieee" for the Institute of Electrical and Electronics Engineers, with a selected password, such as "foobar", to obtain a combination "ieeefoobar", which may then be hashed using MD5, encoded using BASE64 encoding, and truncated at twelve characters to obtain "PpXjLAYpKtr2" for the client base value 210. In an alternate embodiment, the client base value 210 may simply represent the name of a community 180 in plain text; for example, "softball-league". As demonstrated by these illustrative examples, a plurality of client base values 210 may be used for different first usage purposes 220; for instance, one client base value 210 may be used for accepting email from a community 180 comprising a professional society, and another client base value 210 for accepting email from a community 180 comprising a social organization.

The user 110 may disclose the client base value 210 and the client integer 230 to the selected community 180 or to one or more of its members, via email or by other methods of communication, such as posting the client base value 210 and client integer 230 in a place accessible only to members of the community 180 (such as a locked physical facility, a restricted-access Web site, or the like). In some embodiments, a client base value 210 and client integer 230 may be publicly disclosed or published; for example, where they are intended to be used for receiving email from a community 180 comprising all Internet users, including anonymous users.

The second usage purpose 240, in an exemplary embodiment, also comprises granting access or limiting access to the inbox 520. The client integer 230 is associated with this exemplary second usage purpose 240 as follows: Anyone wishing to send email to the inbox 520 may use the client integer 230 and the client base value 220 to construct an email password 505 identical to the client password 270, as described above. The email password 505 is transmitted as part of the request 310, as more fully set forth below. The client integer 230 may, in some embodiments, be updated by the user 110 on a regular, irregular, or periodic basis, or whenever it is determined that too much spam has been delivered to the inbox 520 using that client integer 230. The value of the client integer 230 may be maintained and incremented manually or automatically; for example, by the user 110, by the client computer 120, or by a software application. The client integer 230 may be incremented by one each time it is updated, or may be incremented by a larger number. If desired, only one client integer 230 need be updated for any number of client base values 210. A computer such as client computer 120 may filter the email before or after it is delivered to the inbox 520, to verify the correctness of the email password 505 by comparing it to the client password 270. Senders such as remote user 150 may receive a bounced email when attempting to use an outdated or incorrect email password 505. In that event, senders need only increment the client integer 230, or look up the new client integer 230 in a public place, and construct a new email password 505. This burden may be acceptable to a legitimate sender, but unacceptable to others, for example, spammers or other bulk emailers.

The email password 505, which must be identical to the client password 270 if the request 310 is to be granted, is included in the request 310. For example, the email password 505 may be included in an attachment of the email 400, or in a header field 411 of email 400. The email password 505 may appear in optional headers such as the Subject field, or a Comments field. The email password 505 may appear in a user-defined header such as an X-header field.

In an alternative embodiment, the email password 505 may appear in a destination header, for instance, as part of a destination address for the email 400, included in a To, CC, or BCC field. In order to receive mail at such a destination address, the user 110 may establish an email address comprising the client password 270, using the client email server 510. For example, the user 110 may establish an email address such as PpXjLAYpKtr2@hotmail.com. The email address is associated with the inbox 520, such that the client email server 510 is able to direct an email 400 addressed to the email address into the inbox 520. The client email server 510 may be the client computer 120, or may be a different computer communicatively coupled to the client computer 120, such as a server of an email service such as hotmail.com, gmail.com, yahoo.com, or the like. The email address may be stored on the client email server 510, and may also be stored in client data storage 130.

In some embodiments, if the user 110 determines that an email address receives too much spam, the email address can be discarded by the user 110 (for instance, by closing or terminating the email address or inbox 520, or by discontinuing checking of the inbox 520 for new emails 400). The user 110 may disclose sufficient information to members of the community 180 to enable such members to find or derive a new or updated email address for the user 110.

Simply finding the client base value 210 and client integer 230 for a large number of users 110 will put a burden on spammers and bulk emailers, thereby deterring them from sending email to the users 110. Computing the required hash function 260 is an additional burden. Changing the client integer 230 on a regular basis may prevent spammers from avoiding this additional work. In addition, by determining the client base value 210 that was used to send an undesired email 400, a user 110 may be able to determine which community 180 was the source of the undesired email 400, and may thereby discover which communities 180 are spammer-friendly.

In order to make the burden to a spammer or bulk emailer heavier, while still achieving the benefit of posting the client integer 230 in a location available to members of the community 180, the user 110 may in some embodiments present the client integer 230 or a portion of the client integer 230 (for instance, the one's digit) in the form of an image on a Web site, e.g., as the number of circles in a picture, or as a graphical representation of one or more numerals or words.

Figure 6:
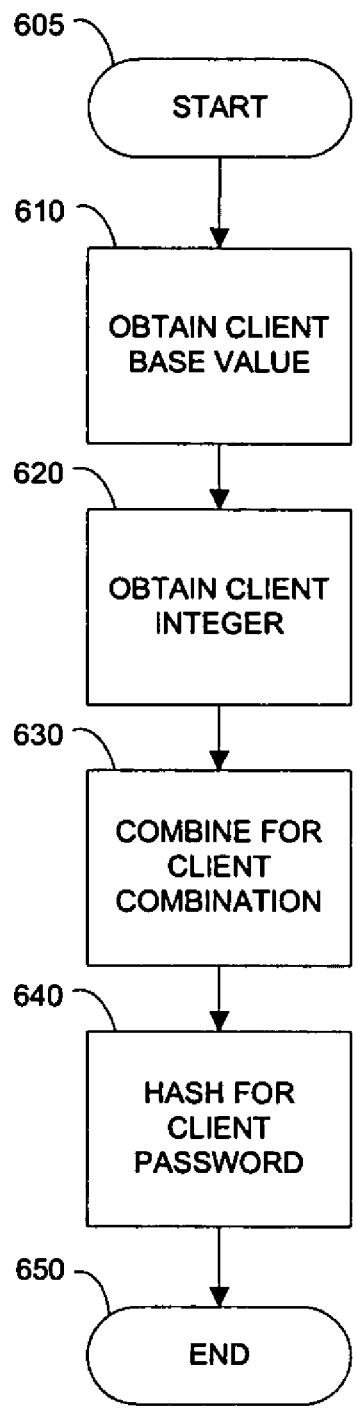
FIG. 6 is a flow chart illustrating a method for authentication according to an embodiment of the invention.

FIG. 6 shows a method for authentication according to an embodiment of the invention. The method begins at start block 605, and proceeds to block 610. At block 610, a client base value 210 is obtained. The client base value 210 may be selected by a user 110 of the client computer 120 for at least a first usage purpose 220. At block 620, a client integer 230 is obtained. The client integer 230 may be selected by the user 110 for at least a second usage purpose 240, At block 630, the client base value 210 is combined with the client integer 230 to obtain a client combination 250. At block 640, the client combination 250 is hashed, by passing the client combination 250 through a hash function 260, to obtain a client password 270. In some embodiments, hashing may further include applying BASE64 encoding to the client password 270. In further embodiments, hashing may also include truncating the client password 270, such as at twelve characters, for reasons such as enhanced security and ease of use. The method concludes at end block 650.

Figure 7:
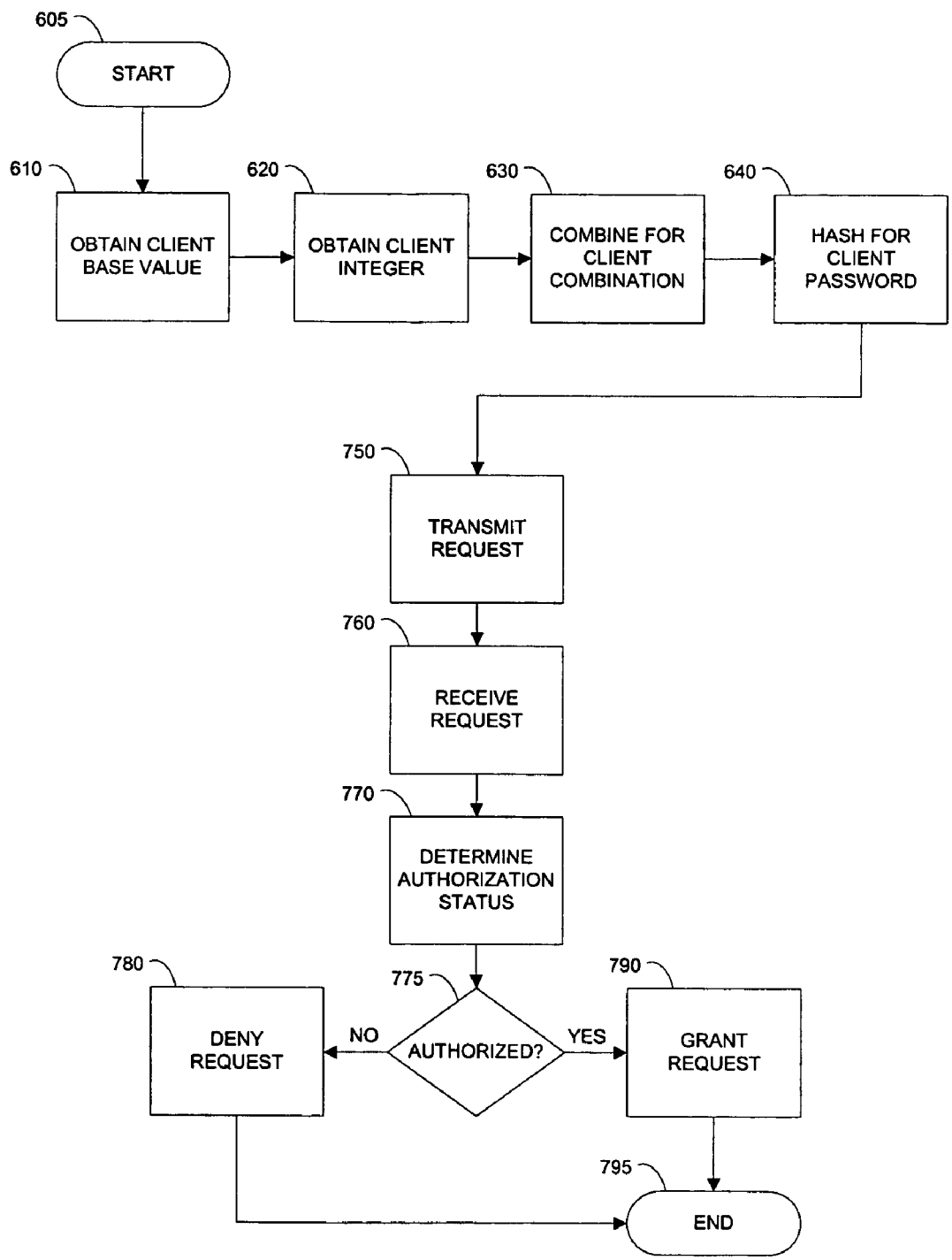
FIG. 7 is a flow chart illustrating a method for authentication according to a further embodiment of the invention.

FIG. 7 shows a method for authentication according to a further embodiment of the invention. The method begins at start block 605, and proceeds through block 640 as described above in the discussion of FIG. 6. The method proceeds from block 640 to block 750.

At block 750, a request 310 is transmitted. In some embodiments, the request 310 comprises the client password 270 and the client integer 230, which may be transmitted by the user 110 to a remote computer 160. In an alternate embodiment, the request 310 comprises an email 400 and an email password 505, which may be transmitted by a remote user 150 of remote computer 160. The email 400 is directed to an inbox 520 associated with the user 110, and may be transmitted to client email server 510.

At block 760, the request 310 is received. In some embodiments, the request 310 is received at the remote computer 160. In alternative embodiments, the request 310 is received at client email server 510.

At block 770, a status 370 of the request 310 is determined. The status 370 includes at least an authorization or an absence of authorization.

In some embodiments, the remote computer 160 determines the status 370 by comparing the client integer 230 to a stored integer 330. If the client integer 230 is higher than the stored integer 330, the remote computer 160 combines the stored base value 320 with the client integer 230 to obtain a remote combination 340. The remote combination 340 is then hashed by passing the remote combination 340 through a hash function 260, to obtain a remote password 350. In some embodiments, hashing may further include applying BASE64 encoding to the remote password 350. In further embodiments, hashing may also include truncating the remote password 350, such as at twelve characters. The remote computer 160 then compares the remote password 350 to the client password 270, and if there is a match, the remote computer 160 may replace the stored integer 330 with the client integer 230 In addition, if there is a match, the request 310 is authorized and the status 370 may be set to indicate such authorization; otherwise, the status 370 is not set to indicate authorization. Thus, the status 370 is determined by whether the remote password 350 matches the client password 270.

In an alternate embodiment, the client email server 510 determines the status 370 by comparing the email password 505 to one or more stored client passwords 270. In a further embodiment, a client password 270 may be stored as an email address associated with inbox 520, and the comparison may be accomplished by attempting to match an email password 505 that is included in a destination header field of the email 400 to the email address that comprises the client password 270. If the email password 505 matches any of the one or more stored client passwords 270, the request 310 is authorized and the status 370 may be set to indicate such authorization; otherwise, the status 370 is not set to indicate authorization.

At block 775, a check is performed on the authorization indicated by status 370. If the check at block 775 indicates that the status 370 is authorized, the method proceeds to block 790; otherwise, if the status 370 is not authorized, the method proceeds to block 780.

At block 780, the request 310 is granted. In some embodiments, the remote computer 160 grants the request 310 by granting access to a desired resource that has been requested by user 110. In an alternate embodiment, the client email server 510 grants the request 310 by delivering the email 400 to inbox 520. The method then proceeds to end block 795, and is concluded.

At block 790, the request 310 is rejected. In some embodiments, the remote computer 160 rejects the request 310 by denying access to a desired resource that has been requested by user 110. In an alternate embodiment, the client email server 510 rejects the request 310 by not delivering the email 400 to inbox 520. In a further embodiment, rejecting the request 310 may include designating the email 400 as spam, or may include returning the email 400 to the sender, such as remote user 150. The method concludes at end block 795.

CONCLUSION

Although exemplary implementations of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A method for authentication in a client computer, comprising:
   obtaining a client base value selected by a user of the client computer for at least a first usage purpose, the first usage purpose comprising generating a one-time password for accessing a web site on a remote computer;
   incrementing a client integer originally selected by the user for at least a second usage purpose such that the client integer increases in value, the second usage purpose comprising limiting access to an email inbox for spam control;
   combining the client base value with the client integer to obtain a client combination;
   hashing the client combination to obtain a client password; and
   maintaining a stored base value and a stored integer for the user on a remote computer, the stored integer being a previous value of the client integer prior to the client integer being incremented and increased in value;
   transmitting to the remote computer a request comprising the client password and the client integer;
   comparing the client integer to the stored integer;
   if the client integer is lower than or equal to the stored integer, rejecting the request;
   if the client integer is higher than the stored integer,
      combining the stored base value with the client integer to obtain a remote combination,
      hashing the remote combination to obtain a remote password, and
      if the remote password does not match the client password, rejecting the request;
      if the remote password matches the client password, authorizing the request, and replacing the stored integer with the client integer, such that the stored integer after being replaced has a higher value than before.

2. The method of claim 1 wherein obtaining a client base value further comprises generating a system-specific password.

3. The method of claim 1 wherein hashing further comprises applying BASE64 encoding to a hash value.

4. The method of claim 1 wherein hashing further comprises truncating a hash value.

5. A method for authentication in a client computer, comprising:
   selecting a client base value for at least a first usage purpose of a user of the client computer, the first usage purpose comprising generating a one-time password for accessing a web site on a remote computer;
   incrementing a client integer originally selected for at least a second usage purpose of the user such that the client integer increases in value, the second usage purpose comprising limiting access to an email inbox for spam control;
   combining the client base value with the client integer to obtain a client combination;
   hashing the client combination to obtain a client password;
   transmitting a request to a remote computer, the request comprising the client password and the client integer;
   receiving the request at the remote computer; maintaining on the remote computer a stored base value and a stored integer for the user, the stored integer being a previous value of the client integer prior to the client integer being incremented and increased in value;
   comparing the client integer to the stored integer;
   if the client integer is lower than or equal to the stored integer, rejecting the request;
   if the client integer is higher than the stored integer,
      combining the stored base value with the client integer to obtain a remote combination;
      hashing the remote combination to obtain a remote password; and
      if the remote password does not match the client password, rejecting the request;
      if the remote password matches the client password, authorizing the request, and replacing the stored integer with the client integer, such that the stored integer after being replaced has a higher value than before.

6. A system for authentication, comprising:
   a client computer adapted to construct a client password by passing a client combination through a hash function, the client combination being formed from a client base value having a first usage purpose selected by a user of the client computer, and a client integer originally selected for a second usage purpose selected by the user, the first usage purpose comprising generating a one-time password for accessing a web site on a remote computer, and the second usage purpose comprising limiting access to an email inbox for spam control, the client integer being incremented by the client computer to increase in value;
   the client computer being further adapted to transmit to the remote computer a request comprising the client password and the client integer;
   a remote computer communicatively coupled to the client computer, and adapted to receive from the client computer a request comprising the client password and the client integer; and
   a remote data store communicatively coupled to the remote computer, comprising a stored base value and a stored integer;
   the remote computer being further adapted to:
      determine an authorization status of the request, and to construct a remote password by passing a remote combination through the hash function, the remote combination being formed from the stored base value and the client integer;
      maintain a stored base value and a stored integer for the user on a remote computer, the stored integer being a previous value of the client integer prior to the client integer being incremented and increased in value;
   comparing the client integer to the stored integer;
   if the client integer is lower than or equal to the stored integer, rejecting the request;
   if the client integer is higher than the stored integer,
      combine the stored base value with the client integer to obtain a remote combination;

hash the remote combination to obtain a remote password; and if the remote password does not match the client password, rejecting the request;

if the remote password matches the client password, authorize the request, and replace the stored integer with the client integer, such that the stored integer after being replaced has a higher value than before.

* * * * *

UNITED STATES PATENT AND TRADEMARK OFFICE
CERTIFICATE OF CORRECTION

| | | |
|---|---|---|
| PATENT NO. | : 7,725,926 B1 | Page 1 of 1 |
| APPLICATION NO. | : 10/924295 | |
| DATED | : May 25, 2010 | |
| INVENTOR(S) | : Alan H. Karp et al. | |

It is certified that error appears in the above-identified patent and that said Letters Patent is hereby corrected as shown below:

In column 12, line 62, in Claim 6, delete "comparing" and insert -- compare --, therefor.

Signed and Sealed this

Ninth Day of November, 2010

David J. Kappos
*Director of the United States Patent and Trademark Office*